Feb. 27, 1951　　　　　H. J. GLANZER　　　　　2,543,012
PIPE THREAD PLUG MEASURING DEVICE
Filed Aug. 25, 1945　　　　　　　　　　　　　　2 Sheets-Sheet 1
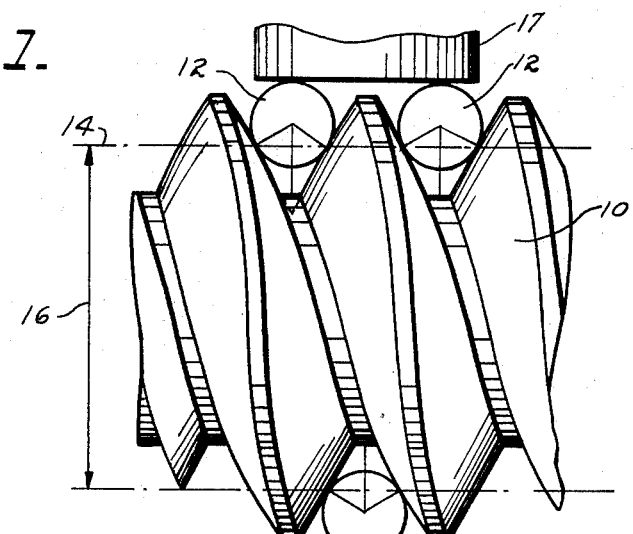
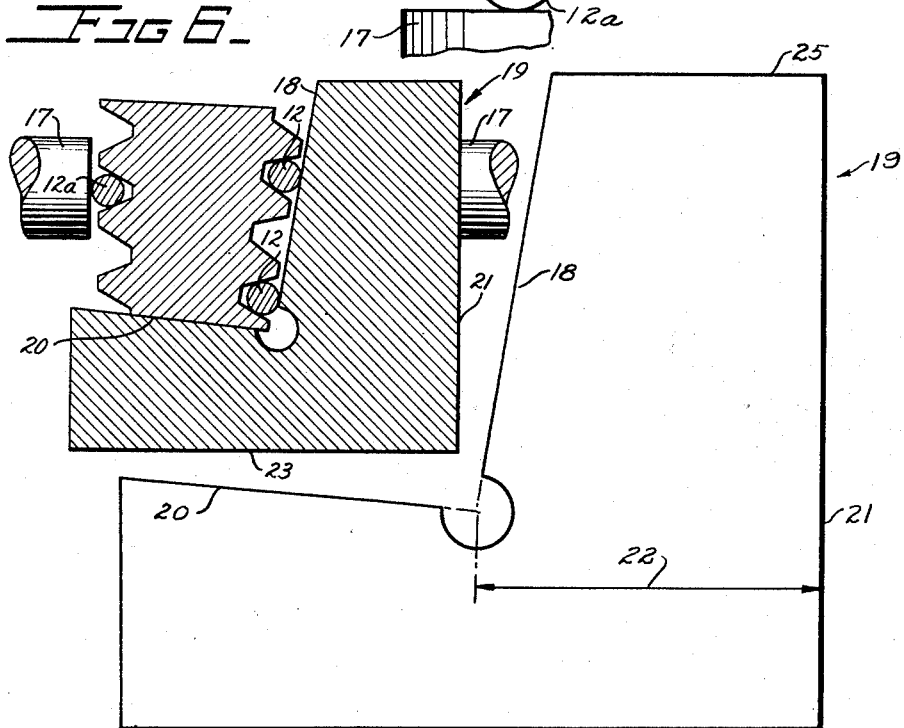
INVENTOR.
HARRY J. GLANZER
ATTORNEYS Feb. 27, 1951  H. J. GLANZER  2,543,012
PIPE THREAD PLUG MEASURING DEVICE
Filed Aug. 25, 1945  2 Sheets-Sheet 2
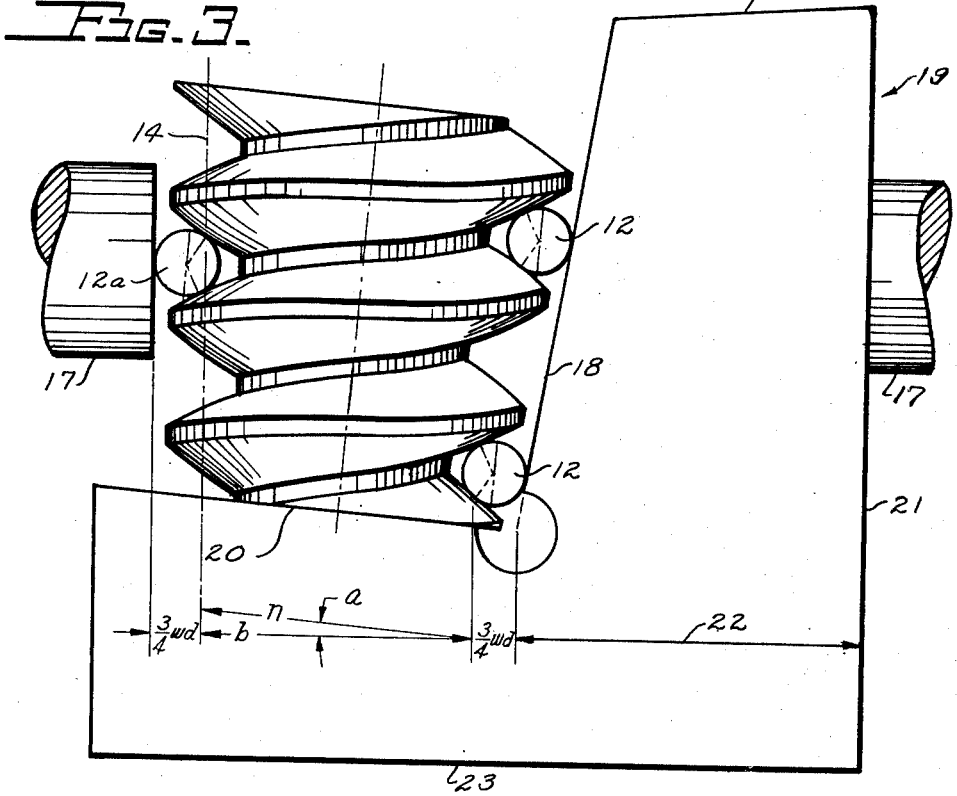
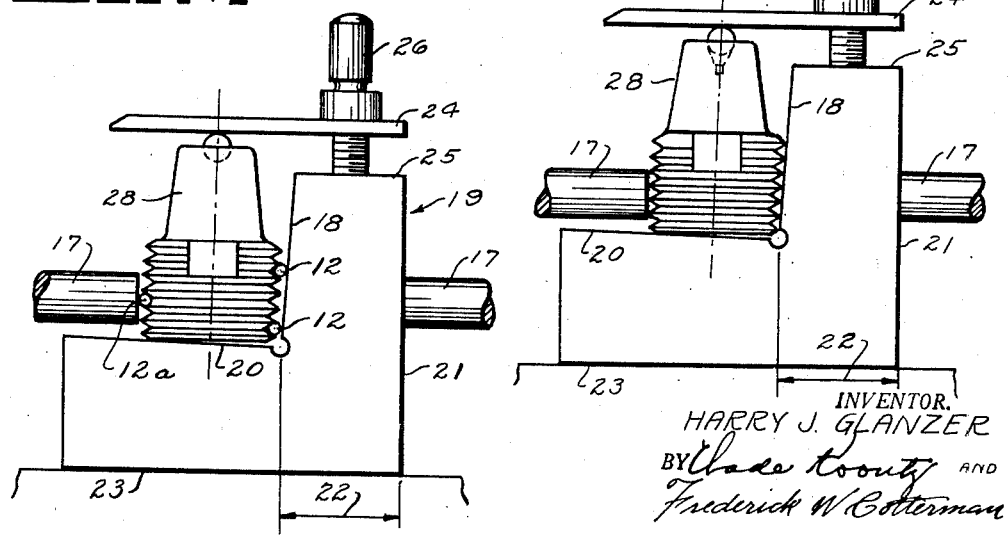
INVENTOR.
HARRY J. GLANZER
BY
ATTORNEYS Patented Feb. 27, 1951

2,543,012

UNITED STATES PATENT OFFICE 2,543,012

PIPE THREAD PLUG MEASURING DEVICE

Harry J. Glanzer, Dayton, Ohio

Application August 25, 1945, Serial No. 612,700

5 Claims. (Cl. 33—199)

(Granted under the act of March 3, 1883, as amended April 30, 1928; 370 O. G. 757)

The invention described herein may be manufactured and used by or for the Government for governmental purposes without payment to me of any royalty thereon.

This invention relates to a device for measuring the pitch diameter of a pipe thread and is particularly useful in checking the pitch diameters of pipe-thread plug-gauges at the extreme small end of the plug.

An object of the invention is to provide a complementary gauge block for use in connection with a pipe plug-gauge whereby the measurement indicated over the pitch diameter of the plug and the block is the same at any distance from the small end of the plug at which the measurement may be taken, whereby the position at which the measurement is taken is not critical.

Other objects and advantages will be evident as the invention is further described with reference to the drawings wherein:

Fig. 1 shows the conventional method of measuring the pitch diameter of a straight U. S. standard thread, the diameter of the wire being so calculated as to contact the thread on the pitch diameter.

Fig. 2 shows my improved measuring block for measuring the pitch diameter of a pipe thread at the end.

Fig. 3 shows a pipe thread in place on my improved measuring block with the measuring wires in position.

Fig. 4 shows a clamp associated with the block for holding the pipe-threaded test piece on the block while measurement is being taken.

Fig. 5 shows how outside diameters of pipe threads may be checked to determine whether the thread is of proper diameter at the extreme small end.

Fig. 6 is a central longitudinal section through the plug and block.

Like reference characters refer to like parts throughout the several views.

Fig. 1 shows a conventional U. S. standard straight thread plug-gauge 10 with wires 12 and 12a laid in place for the purpose of measuring the pitch diameter of the plug. The diameters of the wires 12 and 12a are so calculated that they make contact with the pitch lines 14 whereby the pitch diameter 16 may readily be determined by measuring over the wires 12 and 12a with the anvils 17 of a measuring instrument. Since the included angle between the sides of the thread itself is 60° it is only necessary to subtract one and one-half diameters of the wires from the measurement taken to determine the pitch diameter. When no wire is available of the exact size which will make contact at the pitch diameter, and an odd diameter wire is used instead, the measurement over the wires may be found by the following equation:

$$M = P.D. - \frac{.866025}{N} + 3G$$

wherein,
M=Measurement over the wires,
P. D.=Pitch diameter,
N=Number of threads per inch,
G=Diameter of the wire.

The method illustrated in Fig. 1 is conventional and well known in the art.

Pipe threads, however, are tapered, and the pitch diameter accordingly varies throughout the length of the thread. The designation "pitch diameter" when applied to a pipe thread means the pitch diameter taken at the extreme small end. It is obvious, however, that the three wire system as known in the art could not be employed for measuring pitch diameters at the ends of the plugs.

I accordingly provide a block as shown in Fig. 2, the side 18 of which is at an angle with the vertical an amount equal to the apex angle of the pipe plug and the side 20 of which is at an angle with the horizontal an amount equal to half the apex angle of the pipe plug. This will bring the pitch line 14 which is on the outer side of the plug to a true vertical line as seen in Fig. 3. The distance 22 may preferably be made one inch to simplify the determination of the measurement.

With the wires 12 along the edge 18 of the block spaced as far apart as convenient and the wire 12a positioned at a height which is anywhere between the heights of the wires 12 the measurement may be taken by the anvils 17 as shown in Fig. 3. By now subtracting from the measurement taken, the distance 22 which is one inch and by further subtracting one and one-half diameters, ¾ wd + ¾ wd of the wire 12 or 12a, the result, where wire which contacts the pitch diameter is being used, will be the base b of a right triangle whose acute angle a adjacent the base b is half the apex angle of the plug being measured, and whose hypotenuse h is the pitch diameter taken at the small end of said thread, and this is true regardless of the height of the wires from the small end of the plug when the measurement was taken, or the height of the anvil from the base of the block, assuming of course that the taper of the plug is correct and therefore corresponds to the taper for which the block was made.

In Fig. 4 the block 19 has been provided with a clamp 24 actuated by a screw 26 for holding the plug 28 in place. The device as shown here is being used to check the taper of the plug. To accomplish this the wires 12 on the side 18 of the fixture are spread as far apart as the length of the plug will permit while the wire 12a is placed as nearly midway between the wires 12 as practicable.

By moving the wire 12a to different heights and coincidentally taking measurements with the anvils 17 at said different heights the taper of the plug is checked. If the angle of the taper is greater than desired, the measurement will increase as the wire 12a and the anvils 17 are moved upward. If the taper is found to be correct, the pitch diameter at the small end of the thread plug will again be the hypotenuse $h$ of the triangle whose base $b$ is the measurement taken by the anvils less the distance 22, less one and one-half diameters of the wires 12 and 12a $\frac{3}{4}$ wd + $\frac{3}{4}$ wd and the angle $a$ of which is half the apex angle of the thread plug.

Fig. 3 of the drawings is intended to facilitate an understanding of the procedure for checking the pitch diameter of the plug at the small end. In Fig. 3, the wire diameter makes contact with the sides of the thread on the pitch line of the plug, the wire diameter being designated as $wd$, whereby the distance from the outside of the wire to the pitch line of the plug is $\frac{3}{4}$ $wd$. The line $b$ is an extension of the line 22 and therefore is normal to the surface 21 and forms the base of a triangle of which $a$ is the acute angle adjacent the base and $h$ is the hypotenuse. The line $h$ being drawn parallel to the surface 20 fixes the angle $a$ as half the apex angle of the plug.

If from the measurement taken by the anvils there is subtracted the distance 22 plus one and one-half wire diameters, i. e. ($\frac{3}{4}$ $wd$ + $\frac{3}{4}$ $wd$), the result will be the base $b$ of the triangle (see Fig. 3) whose acute angle $a$ adjacent the base $b$ is half the apex angle of the plug, and whose hypotenuse $h$ is the pitch diameter of the tapered thread plug at the small end of the plug. Having found the base of the triangle by subtracting the value indicated from the measurement taken and knowing the acute angle $a$ adjacent the base $b$ to be one-half the apex angle of the plug the hypotenuse $h$ which is the pitch diameter of the plug at the small end may be found by the well known equation $$h = \frac{b}{\cos. a}$$

Fig. 5 shows a method of checking outside diameters of threads for both taper and for outside diameters at the small end. With the plug 28 clamped in the manner shown measurements may be taken by the anvils 17 at different heights from the base of the block and if these measurements are all alike, the taper is correct, and if the measurements taken by the anvils 17 minus the distance 22, shows the desired outside diameter at the small end of the plug, this measurement will be correct. Obviously the outside diameters and the taper of the plugs may be checked before the threads are put on, in the same manner as is shown in Fig. 5 for a threaded plug.

While throughout the description, the edge 21 of the block has been referred to as being vertical, and the edge 23 as horizontal, and the edges 18 and 20 at designated angles with respect to the vertical and horizontal, it will be understood that the device, as shown, may be used with the edge 21 horizontal or at any other angle, and the edge 23 vertical or at any other angle, the requirement being that the edges 18, 20 and 21 be plane surfaces; that the edge surface 18 be at an angle with the surface 21 equal to the apex angle of the taper of the thread being measured; and that the surface 18 be at an angle with the surface 20 equal to 90° plus half the apex angle of the taper of the thread.

Inasmuch as the block 19 may have any convenient thickness it will have three essential plane surfaces 21, 18 and 20. At the upper end the surface 18 leans toward the surface 21 making an angle between surfaces 21 and 18. The taper of the plug will be correct if the apex angle of the plug exactly equals the included angle between the plane surfaces 21 and 18. The third plane surface 20 is at an angle with the surface 18 of 90 degrees plus one half the apex angle of the plug.

In order that the three plane surfaces 21, 18 and 20 of the block 19 may each have the proper relation to the others, all three surfaces may preferably be described by their relation to a reference plane which passes through the axis of the plug being measured. Such a relation will exist if the reference plane lies in a central longitudinal section through the plug and block as seen in Fig. 6.

Having thus described an embodiment of my invention, I claim:

1. A measuring block for measuring the pitch diameter of a tapered thread plug at the small end of the taper by the three wire system, said measuring block having three plane surfaces related to a reference plane which passes through the axis of said tapered thread plug, the first plane surface being perpendicular to said reference plane, the second plane surface being perpendicular to said reference plane and so positioned that the line of intersection between said second plane surface and said reference plane makes an angle with the line of intersection of said first plane surface and said reference plane that is equal to the apex angle of the tapered thread plug to be measured, the third plane surface being perpendicular to said reference plane and so positioned that the line of intersection between said third plane surface and said reference plane makes an angle with the line of intersection between said second plane surface and said reference plane that is equal to ninety degrees plus one half the apex angle of the tapered thread plug to be measured.

2. A measuring block for measuring the diameter of a tapered thread plug at the small end, said measuring block having plane surfaces related to a given reference plane as follows: a first plane surface perpendicular to said reference plane, a second plane surface perpendicular to said reference plane and so positioned that the line of intersection between said second plane surface and said reference plane makes an angle with the line of intersection of said first plane surface and said reference plane that is equal to the apex angle of the tapered thread plug to be measured, a third plane surface perpendicular to said reference plane and so positioned that the line of intersection between said third plane surface and said reference plane makes an angle with the line of intersection between said second plane surface and said reference plane that is equal to ninety degrees plus one half the apex angle of the tapered thread plug to be measured, and means positioning said tapered thread plug to be measured adjacent to said second surface and upon said third surface with the axis of said thread plug in said reference plane.

3. A measuring block for measuring the pitch diameter of a tapered thread plug at the small end of the taper by the three wire system, said measuring block having three essential plane surfaces, the first and second plane surfaces converging at an angle equal to the apex angle of said tapered thread plug and the second and third plane surfaces diverging at an angle of ninety degrees plus one half the apex angle of the thread plug, a reference plane passing through the axis of the said plug being normal to all three essential surfaces.

4. A measuring block for measuring the pitch diameter of a tapered thread plug at the small end of the taper by the three-wire system, said measuring block having three essential plane surfaces all normal to a reference plane passing through the plug axis, the first and second plane surfaces converging at an angle which is equal to the apex angle of the plug, the second and third plane surfaces diverging at an angle which is equal to ninety degrees plus half the apex angle of the plug.

5. A device for adapting the three wire thread measuring system for checking the tapers and pitch diameters of pipe threads, which consists of a block having a first plane surface, a second plane surface diverging from the first plane surface at an included angle with the first plane surface equal to the apex angle of the taper of the pipe thread to be measured, and a third plane surface extending laterally from the second plane surface at the most diverged end thereof at an included angle with the second plane surface equal to 90° plus half the apex angle of the pipe thread to be measured, and wherein the distance from the convergence of the said second and the said third surfaces to the said first surface normal to the said first surface is equal to one unit of measurement of the pipe thread to be measured.

HARRY J. GLANZER.

REFERENCES CITED

The following references are of record in the file of this patent:

UNITED STATES PATENTS

| Number | Name | Date |
|---|---|---|
| 1,422,161 | Woodrow | July 11, 1922 |
| 1,423,214 | Hill | July 18, 1922 |
| 1,769,129 | Graham | July 1, 1930 |
| 1,862,146 | Hoke | June 7, 1932 |
| 1,875,726 | Hartness | Sept. 6, 1932 |

FOREIGN PATENTS

| Number | Country | Date |
|---|---|---|
| 469,401 | Germany | Dec. 11, 1928 |

OTHER REFERENCES

Publication: "Supplement to Screw-Thread Standards for Federal Services," June 15, 1949, Nat'l. Bureau of Standards.